United States Patent [19]

Baillargeon et al.

[11] Patent Number: 4,822,941
[45] Date of Patent: Apr. 18, 1989

[54] CONVERSION OF ALIPHATICS TO AROMATICS OVER A ZEOLITE CATALYST

[75] Inventors: David J. Baillargeon, Princeton Junction; Yung F. Chu, Plainsboro, both of N.J.

[73] Assignee: Mobil Oil Corporation, New York, N.Y.

[21] Appl. No.: 224,258

[22] Filed: Jul. 25, 1988

Related U.S. Application Data

[63] Continuation of Ser. No. 136,215, Dec. 18, 1987, abandoned, which is a continuation-in-part of Ser. No. 14,147, Feb. 12, 1987, which is a continuation-in-part of Ser. No. 733,818, May 14, 1985, abandoned.

[51] Int. Cl.$^4$ .............................................. C07C 2/52
[52] U.S. Cl. .................................... 585/417; 208/135; 585/418
[58] Field of Search ................. 585/417, 418; 208/135

[56] References Cited

U.S. PATENT DOCUMENTS

| | | | |
|---|---|---|---|
| 3,756,942 | 9/1973 | Cattanach | 208/137 |
| 3,760,024 | 9/1973 | Cattanach | 585/417 |
| 4,175,114 | 11/1979 | Plank et al. | 423/329 |
| 4,180,689 | 12/1979 | Davies et al. | 585/407 |
| 4,199,556 | 4/1980 | Plank et al. | 423/329 |
| 4,275,047 | 6/1981 | Whittam | 423/329 |
| 4,304,686 | 12/1981 | Telford | 252/455 |
| 4,341,748 | 7/1982 | Plank et al. | 423/328 |
| 4,350,835 | 9/1982 | Chester et al. | 585/415 |
| 4,482,774 | 11/1984 | Koetsier | 585/481 |

FOREIGN PATENT DOCUMENTS

| | | |
|---|---|---|
| 0050021 | 4/1982 | European Pat. Off. |
| 0106552 | 4/1984 | European Pat. Off. |
| 0119023 | 9/1984 | European Pat. Off. |

Primary Examiner—Curtis R. Davis
Attorney, Agent, or Firm—Alexander J. McKillop; Charles J. Speciale; Robert B. Furr, Jr.

[57] ABSTRACT

A process is provided for producing aromatic compounds which comprises contacting under conversion conditions a feed comprising aliphatic hydrocarbons, with a crystalline aluminosilicate zeolite catalyst in its acid form having a Constraint Index in the range of about 1 to 12 and prepared by crystallizing a composition comprising an aqueous suspension of a precipitated amorphous silica or aluminosilicate precursor composed of a preponderant number of particles having a particle size in the range of about 1 to 500 microns, said composition being free of any organic or inorganic directing agent and containing a dissolved alumina source if a precipitated amorphous silica is utilized or a precipitated amorphous aluminosilicate is utilized containing less than the desired amount of aluminum. The catalyst is advantageously subjected to a thermal or steam treatment, and/or is impregnated with gallium before being used in the conversion.

13 Claims, No Drawings

CONVERSION OF ALIPHATICS TO AROMATICS OVER A ZEOLITE CATALYST

CROSS-REFERENCE TO RELATED APPLICATIONS

This is a continuation of application Ser. No. 136,125, filed Dec. 18, 1987, and now abandoned, which is a continuation-in-part of application Ser. No. 14,147, filed Feb. 12, 1987, which is a continuation-in-part of application Ser. No. 733,818, filed May 14, 1985 and now abandoned. This application is related to commonly-assigned application Ser. No. 170,580, filed Mar. 18, 1988, which is a continuation of application Ser. No. 905,102, filed Sept. 8, 1986, which is a continuation-in-part of application Ser. No. 733,818, filed May 14, 1985. This application is also related to commonly-assigned application Ser. No. 014,147, filed Feb. 12, 1987, which is a continuation-in-part of application Ser. No. 905,103, filed Sept. 8, 1986.

BACKGROUND OF THE INVENTION

1. Field of the Invention

This invention relates to a process for the conversion of a feedstock comprising aliphatic hydrocarbons to aromatics in the presence of a zeolite catalyst prepared without a directing agent, as hereinafter defined.

2. Background Information

Zeolites have been used in the past in the preparation of catalysts for the production of aromatic hydrocarbons from aliphatic hydrocarbons by passing the aliphatic hydrocarbon over the catalyst at an elevated temperature in the liquid or vapor phase. Zeolites of various types have been suggested for the preparation of such catalysts, e.g., ZSM-type zeolites containing any of various cations such as hydrogen, ammonium, or metallic cations, e.g., gallium, or containing any of various metal oxides impregnated on its surface, e.g., a gallium oxide. However, when using these zeolite catalysts, any means which can be employed to improve the yield of desirable aromatics such as benzene, toluene, and the xylenes is generally considered desirable.

3. Information Disclosure Statement

The following information is disclosed in accordance with the terms of 37 CFR 1.56, 1.97 and 1.98.

Cattanach, U.S. Pat. Nos. 3,756,942 and 3,760,024, discloses the preparation of aromatic compounds from aliphatic compounds using as catalyst a ZSM-type zeolite in which at least some of the original cations have been replaced by hydrogen, ammonium or metallic cations, or impregnated with a metallic component as described previously. The patentee also contemplates a thermal treatment in air or a steam treatment at a temperature up to 1500° F. (816.6° C.).

Davies et al., U.S. Pat. No. 4,180,689, teaches processes for the production of aromatics by contacting a $C_3$-$C_{12}$ hydrocarbon feedstock with a catalyst in which gallium is supported on an aluminosilicate, e.g. ZSM-5. After addition of the gallium, the catalyst is activated at a temperature of between 400° and 650° C.

Telford, U.S. Pat. No. 4,304,686, teaches the aromatization of aliphatic hydrocarbons utilizing as catalyst a zeolite having a silica/alumina molar ratio of 10:1 to 500:1 in which at least some of the cations have been exchanged for gallium ions. The zeolite is calcined at a temperature of at least 300° C., suitably between 300° and 800° C., before being treated to effect the gallium exchange.

Chester et al., U.S. Pat. No. 4,350,835, teach a catalytic process for converting a feedstock comprising a high percentage of ethane to aromatics employing as a catalyst a zeolite, e.g., ZSM-5, with a silica/alumina ratio of at least 12 and having incorporated therein a minor amount of gallium. The zeolite is calcined at 540° C. before the incorporation of the gallium.

Telford et al., U.S. Pat. No. 4,487,853 discloses the conversion of hydrocarbon feedstocks to aromatics using a catalyst subjected during its preparation to a steam treatment followed by loading with a Group IIIb metal, especially gallium. The catalyst may also be calcined under dry conditions at or about 550° C. one or more times in the course of its preparation.

Plank et al., U.S. Patent Nos. 4,175,114; 4,199,556; and 4,341,748, teach the preparation of zeolites, e.g., ZSM-5, without employing any organic cations, but utilizing instead seeds of the desired zeolite in the formulating mixture which seeds themselves were formed in the presence of organic ions or from other seeds formed in the presence of organic ions, etc., and/or an aliphatic alcohol containing 2 to 5 carbon atoms. The patentees show the use of their zeolites as catalysts for "M-forming," i.e., the alkylation of benzene with n-heptane.

European Patent Application Publication No. 50,021 teaches a process for producing aromatic hydrocarbons by contacting a feedstock containing at least 70% weight of $C_2$ hydrocarbons with a catalyst comprising an aluminosilicate, e.g., ZSM-5, with a silica/alumina molar ratio of at least 5:1, and in which either gallium is deposited thereon, or cations have been exchanged with gallium ions. After the incorporation of the gallium, the catalyst is activated at a temperature of between 400° C. and 650° C.

In each of the foregoing references, the disclosed zeolite is formed in the presence of an organic and/or inorganic directing agent as hereinafter defined.

European Patent Application Publication No. 106,552 discloses the preparation of zeolites similar to ZSM-5 by crystallizing a homogeneous phase compound of a granular amorphous aluminosilicate in water or in an aqueous solution of an alkali metal hydroxide and/or an alkali metal silicate. The zeolites are prepared "without using organic and inorganic mineralizers," which mineralizers appear to be substantially equivalent to what applicants refer to as organic or inorganic directing agents or templates. The patent publication points out that the zeolite, after being ion-exchanged with appropriate cations, can be used as a catalyst in the form of a crystal aggregate or after fine pulverization, but does not mention any specific reaction which can be catalyzed.

European Patent Application Publication No. 119,023 discloses the improvement of the catalytic activity of a zeolite for the aromatization of paraffins by steam treating the zeolite and then loading it with a Group IIIB metal, especially gallium. The zeolite is prepared in the presence of an organic directing agent.

Pending parent application Ser. No. 14,147, filed Feb. 12, 1987, teaches the synthesis of various zeolites, e.g., ZSM-5, by crystallizing a reaction mixture comprising a precipitated amorphous silica or aluminosilicate having a particle size of 1 to 500 microns. No organic "template" or "directing agent" is utilized in the preparation and the disclosure also contemplates preparation in which no inorganic directing agents, e.g., zeolite seeds, are employed. The application discloses the use of the zeolite as a catalyst in the aromatization of paraffins and olefins. That portion of the disclosure of Ser. No. 14,147 which deals with the preparation and use of zeolites contemplated by this invention, e.g., aluminosilicate zeolites having a Constraint Index in the range of about 1 to 12, and prepared by crystallizing a composition free of any organic or inorganic directing agents, e.g., organic amines or ammonium salts of such organic amines, or zeolite seeds, is incorporated herein by reference.

SUMMARY OF THE INVENTION

Briefly stated, this invention comprises a process for producing desirable aromatic compounds, e.g., benzene, toluene and xylenes, including contacting under suitable conversion conditions a feedstock comprising aliphatic hydrocarbons, e.g. paraffins, preferably in major proportion, i.e., at least 50 wt. %, and containing 2 to 12 carbon atoms, with a crystalline aluminosilicate zeolite catalyst in the acid form having a Constraint Index in the approximate range of about 1 to 12 and prepared by crystallizing a composition comprising an aqueous suspension of a precipitated amorphous silica or aluminosilicate precursor composed of a preponderant number of particles having a particle size in the greater than colloid range, e.g., a range of about 1 to 500 microns, said composition being free of any organic directing agent as hereinafter defined. In addition to the precipitated amorphous silica or aluminosilicate, the composition may contain any of various dissolved metal oxide precursors, e.g., salts. A dissolved alumina precursor, e.g., an aluminum salt, must be present during crystallization if a precipitated amorphous silica is used as the precursor, which contains less than the amount of aluminum which would be present in the desired aluminosilicate crystals.

The term "directing agent", which is synonymous with the terms "template" and "mineralizer" as used in published references, refers to any component in the composition to be crystallized, which has a "directing" effect on the structure of the crystals being formed, as distinct from the components which actually supply the major proportion of the necessary building blocks of the crystals when ready for use. Thus, a variety of organic directing agents or templates are utilized in zeolite crystallizing compositions for the purpose of effecting the structure of the crystals but which are eliminated on subsequent treatment of the zeolite, e.g., calcination. These include various organic amines and their quaternary ammonium salts and bases, and alkanols containing 2 to 5 carbon atoms. Moreover, inorganic directing agents have also been used, e.g., "seeds" of the same or a different zeolite as that being produced, as taught, for example in previously cited U.S. Pat. Nos. 4,175,114; 4,199,556; and 4,341,748 of Plank et al. While the seeds may end up as part of the final zeolite crystals, they are generally used in much lower quantity than the other components of the crystal-forming process.

Using the process and catalyst of this invention, it is possible to increase the per pass yields of aromatics from preponderantly aliphatic, e.g. paraffinic, feedstock over those obtained when corresponding conventional zeolites, i.e. those prepared using organic directing agents or templates, are used as the aromatization catalyst.

DESCRIPTION OF SPECIFIC EMBODIMENTS

The zeolite catalyst utilized in the process of this invention is prepared by crystallizing in water a composition free of any organic directing agents and comprising a precipitated amorphous silica or aluminosilicate composed of a preponderant number of particles having a particle size in the greater than colloid range, e.g., a range of about 1 to 500 microns, together with a dissolved aluminum salt if a precipitated silica, or precipitated aluminosilicate not containing sufficient aluminum, is utilized, at an elevated temperature and for a period of time sufficient to obtain the desired zeolite.

The precipitated amorphous silica or aluminosilicate may be formed from a silica source by any method known in the art, as by precipitation from an aqueous solution of a soluble silicate such as an alkali metal silicate, preferably sodium silicate. In the case of an aqueous solution of an alkali metal silicate, which is basic, the precipitation may be carried out by neutralization with an acid as precipitating agent, e.g., by slow batchwise or continuous mixing of the silicate solution with a mineral acid such as sulfuric, hydrochloric or nitric acid, while keeping the molar proportions of the reactants substantially constant.

In one method of preparing the catalyst utilized in the process of this invention, a precipitated amorphous silica is prepared by the batchwise or continuous precipitation of a silica source, e.g., sodium silicate, from solution in the absence of any added alumina precursors. Although a small amount of aluminum may be present in such precipitated silica due to its widespread presence in silicon containing raw materials, such amount is generally less than that required to be present in the subsequently formed zeolite. In this case, therefore, it is necessary to add a soluble alumina source, e.g., an aluminum salt such as aluminum sulfate or nitrate, to the precipitated silica dispersion before crystallization, so as to obtain the desired framework aluminum content in the resulting zeolite.

In another embodiment, a precipitated amorphous aluminosilicate having the desired aluminum content is prepared by precipitating with an acid a solution of a silica source, e.g., soluble silicate, in the presence of a soluble alumina source, e.g., a soluble aluminum salt. In this case, also, the precipitation should be carried out, batchwise or continuously, by mixing the reactants slowly while keeping their molar proportions substantially constant. The use of such a precipitated aluminosilicate results in the subsequent formation of a crystalline zeolite having the same silicon/aluminum ratio.

Other conditions affecting precipitation include time, pH and temperature. The temperature of the precipitation mixture can range from about 80° to 300° F. (about 27° C. to 150° C.). The time of contact of the solution of silica source and the precipitating reagent can range from about 10 minutes to several hours at a pH maintained from about 6 to 11.

The size of a preponderance of the particles of the contemplated precipitated amorphous silica or aluminosilicate in general exceeds that silica particle size at which silica gel formation is possible. The precipitated silica precursors comprises agglomerated solids in the shape of microspheres. Suspensions of these particles exhibit low viscosities at high solids loadings in subsequent processing, including zeolite synthesis, for example, even at solids loading equal to or greater than 20–30% and even at 35% solids. In general, the size of a preponderance of particles of the silica or aluminosilicate precipitate ranges from about 1 to 500 microns but the average size is in the range of about 50 to 100 microns.

In addition to silicon and aluminum, the zeolite used in the process of this invention can contain minor amounts of other framework elements, e.g., by providing a soluble source of such element in the solution of silica source and, optionally, alumina source used to prepare the precipitated amorphous silica or aluminosilicate, or alternatively, providing the soluble source of such element in the crystallization mixture. Such other elements are, for example, gallium, indium, boron, iron, chromium, magnesium, zirconium, berylium, thorium, the rare earth metals or combinations thereof.

Crystallization of the zeolite can be carried out under either static or stirred conditions, at a temperature, for example, of about 80° C. to about 250° C. or higher temperatures for a period, for example, of at least 2 hours, e.g., about 2–3 hours to 150 days. Thereafter, the crystals are separated from the liquid and recovered.

The crystallization mixture can be prepared either batchwise or continuously. Crystal size and crystallization time of the crystalline material, will vary with the nature of the reaction mixture employed and the crystallization conditions. In all cases, the proportions of reactants and crystallization procedure will be consistent with the desired zeolite from the contemplated class of zeolites as described hereinafter. In particular, the proportions of reactants are controlled so that the silica/alumina molar ratio is within the range specified in the art for the desired zeolite. However, whichever the zeolite, and particularly, in the case of ZSM-5 which is preferred for use in the process of this invention, the as synthesized silica/alumina molar ratio will generally be in the range, for example, of about 20 to 100.

Further details on the preparation of the contemplated precipitated amorphous silica or aluminosilicate and crystallized zeolite used in the formation of the catalyst employed in the process of this invention are taught in the disclosures of parent application Ser. No. 14,147, filed Feb. 17, 1987, the relevant portions of which have been incorporated by reference.

Ion exchange of the crystalline silicate materials can be conducted to effect ammonium exchange at their cationic sites. The source of the ammonium ion is not critical; thus the source can be ammonium hydroxide or an ammonium salt such as ammonium nitrate, ammonium sulfate, ammonium chloride and mixtures thereof. These reagents are usually in aqueous solutions, e.g., of one normal concentration, and ammonium exchange may be conducted in multiple stages. Calcination of the ammomium exchanged zeolite at a temperature, for example, of up to 600° C., will produce the zeolite in its acid, i.e., "H" or protonated form, contemplated for use in the process of this invention.

The process of the present invention may be carried out using catalysts in which a metallic element is impregnated on the surface of the acid form of the zeolite or is ion-exchanged with some of the original cations or ammonium or hydrogen ions of the zeolite using techniques of impregnation or ion-exchange which are well-known in the art. For example, the metallic element may be impregnated on the surface of the zeolite by preparing a solution, e.g., an aqueous solution of the metallic element compound such as the nitrate and adding to this solution a preshaped form of the desired zeolite such as 14/25 mesh particles with or without a binder, or in the form of a fluid bed powder, and allowing the zeolite to be thoroughly contacted with the solution. The contacted catalyst is then dried at a moderate temperature, e.g., 100° to 120° C. After calcination, e.g., at 538° C., the zeolite contains the metallic element impregnated on its surface in the form of the metal oxide.

The metallic element in the catalyst composition is present as ions if some cations in the aluminosilicate support have been exchanged with metal ions. In this case, the metal ions are suitably provided as an aqueous solution of a salt such as for instance, the sulfate, nitrate, or chloride. Such catalysts may be produced by conventional ion exchange techniques and the catalysts so produced are subsequently dried. For example, an aqueous solution of a soluble metal compound such as the nitrate may be placed in contact with the ammonium form of a preshaped form of the zeolite at ambient or elevated temperature, e.g, by refluxing. The exchanged zeolite is then separated by decantation followed by filtration, washed several times with deionized water and finally dried.

When the catalyst composition is prepared by using a compound of a metal which ionizes in aqueous solution, for example, the nitrate, some of the ions are generally exchanged with the cations in the zeolite even if the preparation was directed to impregnation.

Whichever method of catalyst preparation is used, the amount of metallic element present in the total catalyst composition, if used, may vary, for example, between about 0.5 and 5 percent by weight, preferably between about 0.5 and 2.0 percent by weight. Metallic elements which may be present in impregnated form or as replacing cations are one or more of various suitable metals in Groups I through VIII of the Periodic Table including by way of example gallium (which is preferred), zinc, platinum, rhenium, cobalt, titanium, tellurium, sodium, nickel, chromium, aluminum, copper, palladium, tin, iron, calcium, manganese, magnesium, cadmium, aluminum and rare earth metals or other modifiers, such as phosphorus.

In accordance with another aspect of the invention, the yield per pass of aromatics, in particular BTX, i.e., benzene, toluene and $C_8$ aromatics including the xylenes and ethylbenzene, and benzene considered alone, is improved by subjecting the catalyst before use to a steam/ammonia or thermal treatment. The steam/ammonia treatment may be carried out by contacting the catalyst with a vapor consisting of steam alone, ammonia alone, or a gas containing at least about 0.1 wt. % of steam or ammonia, or both mixed with up to 99.9 wt. % of other vapors such as nitrogen in any proportion, at a temperature, for example, of at least 200° C., e.g., about 200° to 800° C., for a period of time, for example, of at least about 0.5 hour, e.g., about 0.5 to 500 hours.

The contemplated thermal treatment may be carried out by heating the catalyst, e.g., in air or nitrogen, to a temperature, for example, of at least about 675°, e.g., about 675° to 1000° C. for a period of time, for example, of at least about 1 hour, e.g., about 1 to 10 hours.

The silica/alumina ratio of the catalyst may be determined by conventional analysis. This ratio is meant to represent, as closely as possible, the ratio in the rigid anionic framework of the zeolite crystal and to exclude aluminum in the binder or in cationic or other form within the channels. As synthesized, ZSM-5 zeolites having a silica/alumina molar ratio in the contemplated range, e.g., about 20 to 100, may be modified to higher silica/alumina molar ratios, e.g., up to 1000, by decreasing the aluminum content of the zeolites by steaming, dealuminizing or framework exchange procedures.

The members of the class of zeolites useful herein have an effective pore size of generally about 5 to about 8 angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolites is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular zeolite solely from theoretical structural considerations.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index, and zeolites which provide relatively free access to the internal zeolite structure have a low value for the Constraint Index, and usually pores of large size, e.g. greater than 8 angstroms. The method by which Constraint Index is determined is described fully in U.S. Pat. No. 4,016,218, incorporated herein by reference for details of the method.

Constraint Index (CI) values for some typical materials are:

|  | CI (at test temperature) |
|---|---|
| ZSM-4 | 0.5 (316° C.) |
| ZSM-5 | 6-8.3 (371° C.-316° C.) |
| ZSM-11 | 5-8.7 (371° C.-316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-38 | 2 (510° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6-2.0 (316° C.-399° C.) |

The above-described Constraint Index is an important and even critical definition of these zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g., temperature, as to establish more than one value for the Constraint Index of a particular zeolite. This explains the range of Constraint Indices for some zeolites, such as ZSM-5, ZSM-11 and Beta.

It is to be realized that the above CI values typically characterize the specified zeolites, but that such are the cumulative result of several variables useful in the determination and calculation thereof. Thus, for a given zeolite exhibiting a CI value within the range of 1 to 12, depending on the temperature employed during the test method within the range of 290° C. to about 538° C., with accompanying conversion between 10% and 60%, the CI may vary within the indicated range of 1 to 12. Likewise, other variables such as the crystal size of the zeolite, the presence of possibly occluded contaminants and binders intimately combined with the zeolite may affect the CI. It will accordingly be understood to those skilled in the art that the CI, as utilized herein, while affording a highly useful means for characterizing the zeolites of interest is approximate, taking into consideration the manner of its determination, with the possibility, in some instances, of compounding variable extremes. However, in all instances, at a temperature within the above-specified range of 290° C. to about 538° C., the CI will have a value for any given zeolite of interest herein within the approximate range of 1 to 12.

The class of zeolites defined herein is exemplified by ZSM-5, ZSM-11, ZSM-12, ZSM-23, ZSM-35, ZSM-38, ZSM-48, and other similar materials. The compositions, methods of preparation, and X-ray diffraction patterns of these zeolites are typified in the following patents: ZSM-5 in the U.S. Pat. Nos. 3,702,886 and Re. No. 29,948; ZSM-11 in U.S. Pat. No. 3,709,979; ZSM-12 in U.S. Pat. No. 3,832,449; ZSM-23 in U.S. Pat. No. 4,076,842; ZSM-35 in U.S. Pat. No. 4,016,245; ZSM-38 in U.S. Pat. No. 4,046,859 and ZSM-48 in U.S. Pat. No. 4,350,835. The entire disclosures of these patents are incorporated by reference insofar as their disclosures are necessary to identify the respective zeolites.

It is to be understood that by incorporating by reference the foregoing patents to describe examples of specific members of the novel class with greater particularity, it is intended that identification of the therein disclosed crystalline zeolites be resolved on the basis of their respective X-ray diffraction patterns. As discussed above, the present invention contemplates utilization of such catalysts prepared in the manner described, wherein the mole ratio of silica to alumina is at least about 20 and may be as high as about 100 as synthesized. The incorporation of the identified patents should therefore not be construed as limiting the disclosed crystalline zeolites to those having the specific silica/alumina mole ratios discussed therein, it now being known that such zeolites may have higher silica/alumina ratios and yet, having the same crystal structure as the disclosed materials, may be useful or even preferred in some applications. It is the crystal structure, as identified by the X-ray diffraction "fingerprint", which establishes the identity of the specific crystalline zeolite material.

The preferred crystalline zeolites for utilization herein include ZSM-5, ZSM-11, ZSM-12, ZSM-23, ZSM-35, ZSM-38 and ZSM-48, with ZSM-5 being particularly preferred.

In a preferred aspect of this invention, the zeolites hereof are selected as those providing among other things a crystal framework density, in the dry hydrogen form, of not less than about 1.6 grams per cubic centimeter. Therefore, the preferred zeolites useful with respect to this invention are those having a Constraint Index as defined above of about 1 to about 12, a silica to alumina mole ratio of at least about 20 and up to about 100 as synthesized, and a dried crystal density of not less than about 1.6 grams per cubic centimeter. The dry density for known structures may be calculated from the number of silicon plus aluminum atoms per 1000 cubic angstroms, as given, e.g., on Page 19 of the article ZEOLITE STRUCTURE by W. M. Meier. This paper, the entire contents of which are incorporated herein by reference, is included in PROCEEDINGS OF THE CONFERENCE ON MOLECULAR SIEVES, (London, April 1967) published by the Society of Chemical Industry, London, 1968.

When the crystal structure is unknown, the crystal framework density may be determined by classical pycnometer techniques. For example, it may be determined by immersing the dry hydrogen form of the zeolite in an organic solvent which is not absorbed by the crystal. Or, the crystal density may be determined by mercury porosimetry, since mercury will fill the interstices between crystals but will not penetrate the intra-crystalline free space.

It is possible that the unusual sustained activity and stability of this special class of zeolites is associated with its high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites, including some which are not within the purview of this invention, are:

|  | Void Volume | Framework Density |
| --- | --- | --- |
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

In utilizing the catalyst contemplated by this invention, it may be advantageous to incorporate the zeolite, prepared in the prescribed manner, with a matrix comprising another material resistant to the temperature and other conditions employed in the process. Such matrix material is useful as a binder and imparts greater resistance to the catalyst for the severe temperature, pressure and reactant feed stream velocity conditions encountered in many conversion processes.

Useful matrix materials included both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, kickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alimina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix, on an anhydrous basis, may vary widely, with the zeolite content ranging from between about 1 to about 99 percent by weight and more usually in the range of about 25 to about 65 percent by weight of the dry composite.

The feed stream to the process of this invention preferably contains at least about 50% by weight of at least one aliphatic hydrocarbon containing 2 to 12 carbon atoms. The hydrocarbon may be straight chain, open or cyclic and may be saturated or unsaturated. Some contemplated hydrocarbons are propane, propylene, n-butane, n-butenes, isobutane, isobutene, and straight- and branch-chain and cyclic pentanes, pentenes, hexanes, hexenes, heptanes, heptenes, octanes, octenes, nonanes, nonenes, decanes and decenes. A particularly preferred feedstock is the raffinate remaining after the extraction of aromatic from a reformed refinery stream and containing over 90 wt. % non-aromatic and over 50 wt. % $C_5$–$C_7$ paraffins.

The process of this invention is conducted so that the feed containing a high percentage of aliphatic hydrocarbons as defined, is contacted with a catalyst of this invention in a reaction zone, such as, for example, a fixed bed of catalyst composition under effective conversion conditions. In a typical embodiment of the process in this invention, the feed stream is introduced into the reaction zone at a temperature within the range of about 100° C. to about 700° C., preferably about 450° C. to 700° C., a pressure within the range of about 0.1 atmosphere to about 60 atmospheres, preferably about one atmosphere to 60 atmospheres, a WHSV of about 0.5 to about 400, preferably about 0.5 to 50, and a hydrogen/hydrocarbon mole ratio of from about 0 to about 20.

The effluent from the reaction zone is separated and distilled to remove the desired aromatic product and the remainder is recycled for further reaction.

The process of this invention may be carried out with the catalyst in the form of a fixed, moving, or fluidized bed.

The following examples further illustrate the invention. Examples 1 to 7 are embodiments of processes carried out within the invention, i.e., using a ZSM-5 zeolite-based catalyst wherein the zeolite was prepared from a composition comprising a precipitated amorphous silica free of any organic directing agent, whereas comparative Examples A to D are embodiments of processes carried out with catalysts based on a conventional ZSM-5 zeolite prepared in the presence of an organic directing agent or template.

EXAMPLE 1

A suspension of a precipitated amorphous silica containing 46.5% of solids comprising a preponderance of particles of with a particle size of about 1 to 500 microns, was prepared by slowly neutralizing an aqueous sodium silicate solution with aqueous sulfuric acid while keeping the molar ratio of the reactants approximately content, as taught in parent application Ser. No. 14,147. The foregoing suspension in an amount of 90.63 parts by weight was mixed with 8.16 parts by weight of water, 13.4 parts by weight of $Al_2(SO_4)_3 \cdot 14H_2O$, and 14.81 parts by weight of a 50 wt. % aqueous solution of NaOH. The resulting reaction mixture had the following composition in mole ratios:

$SiO_2/Al_2O_3 = 31$
$H_2O/SiO_2 = 5.9$
$OH^-/SiO_2 = 0.074$ and a solids content of 34 wt. %.

The reaction mixture was heated directly to 350° F. (176.7° C.) and stirred in an autoclave at that temperature for crystallization. After 12 hours the resulting ZSM-5 zeolite crystals were separated from the remaining liquid by filtration, washed with water and dried at 250° F.

To prepare the acid form of the zeolite utilized as catalyst, the zeolite was triply exchanged in three volumes of 1.0 N aqueous ammonium nitrate, thoroughly washed with fresh water, and dried in air at 100°-120° C. to give the ammonium form of the zeolite. The final acid form was obtained by calcining at a final temperature of 538° C. for at least 2 hours. Before use, the pure unbound zeolite powder was pelletized to 14/25 mesh particles.

The activity of the catalyst was tested by feeding n-hexane at atmospheric pressure into a quartz downflow, fixed-bed reactor containing the catalyst at 500°-600° C. and a WHSV of 1. Both the hot reactor effluent and the cold reactor off-gas were sampled directly and analyzed via an on-line gas chromotograph. Such analysis of the product was undertaken after various times on stream after which the temperature was raised to a higher level. A conversion of n-hexane of 100% was obtained for all the samples. The conditions at which samples were analyzed and the results of the analyses in terms of the yield of significant components of the product are shown in Table I where "BTX" is the total $C_6$-$C_8$ aromatics produced. The other listed product components are self-explanatory.

TABLE I

| Temperature °C. | 500 | 550 | 600 |
|---|---|---|---|
| Time on Stream, Hours | 1.7 | 2.7 | 3.07 |

TABLE I-continued

| Yield, wt. % | | | |
|---|---|---|---|
| Benzene | 10.9 | 19.4 | 25.5 |
| Toluene | 14 | 17.1 | 14.1 |
| $C_8$ Aromatics | 6 | 5 | 2.6 |
| Total BTX | 30.9 | 41.5 | 42.2 |
| Total Aromatics | 39.4 | 51.5 | 54.6 |
| $C_1$ + Ethane | 30.3 | 37.6 | 38.6 |
| Propane | 23.4 | 4.8 | 0.6 |

COMPARATIVE EXAMPLE A

The procedure of Example 1 was generally followed except that the zeolite was the acid form of a conventional ZSM-5 having a silica/alumina molar ratio of 55:1 and prepared with an organic directing agent or template as described in European Patent Application Publication No. 130,809, the entire disclosure of which is incorporated by reference. The preparation of the acid form of the zeolite was as described in Example 1 and the times were slightly different from those of Example 1. The conditions and results of the conversion of n-hexane are shown in Table II.

TABLE II

| Temperature, °C. | 500 | 550 | 600 |
|---|---|---|---|
| Time on Stream, hours | 2.0 | 3.0 | 4.0 |
| Yield, wt. % | | | |
| Benzene | 5.4 | 10 | 16.9 |
| Toluene | 11.6 | 15.6 | 17 |
| $C_8$ Aromatics | 7.5 | 7.6 | 5.7 |
| Total BTX | 24.5 | 33.2 | 39.6 |
| Total Aromatics | 29.3 | 38.8 | 45 |
| $C_1$ + Ethane | 16.1 | 26.5 | 33.9 |
| Propane | 43.2 | 32.8 | 15.4 |

A comparison of the results of Example 1 and Comparative Example A as shown in Tables I and II indicates that the process of this invention utilizing a zeolite catalyst prepared from a composition comprising a precipitated amorphous silica and free of any organic or inorganic directing agent or template, yields a larger proportion of aromatics, particularly the most valuable BTX fraction and benzene, and a lower proportion of paraffins such as the $C_1$+ethane and propane components, than when a corresponding conventional zeolite prepared with an organic directing agent or template, was employed.

EXAMPLE 2

The procedure of Example 1 was repeated except that the WHSV was 4.9 and the times on stream were slightly different. Conditions and results are shown in Table III.

TABLE III

| Temperature, °C. | 500 | 550 | 600 |
|---|---|---|---|
| Time on Stream, Hours | 2.0 | 3.0 | 4.0 |
| Yield, wt. % | | | |
| Benzene | 6.1 | 9.7 | 13.6 |
| Toluene | 11.5 | 15.5 | 17.1 |
| $C_8$ Aromatics | 6.7 | 7.16 | 7 |
| Total BTX | 24.3 | 32.8 | 37.7 |
| Total Aromatics | 28.8 | 37.5 | 42.9 |
| $C_1$ + Ethane | 15.7 | 26.5 | 29.6 |
| Propane | 43.4 | 24.4 | 12.6 |

COMPARATIVE EXAMPLE B

The procedure of Comparative Example A was followed except that the WHSV was 4.9. Conditions and results, including percent conversations slightly less than 100% at temperatures of 500° and 550° C., are shown in Table IV.

TABLE IV

| Temperature, °C. | 500 | 550 | 600 |
|---|---|---|---|
| Time on Stream, Hours | 2.0 | 3.0 | 4.0 |
| Percent conversion | 99.7 | 99.9 | 100 |
| Yield, wt. % | | | |
| Benzene | 3.1 | 5 | 8.9 |
| Toluene | 8.2 | 11.1 | 14.2 |
| $C_8$ Aromatics | 6.7 | 7.3 | 6.8 |
| Total BTX | 18 | 23.4 | 29.9 |
| Total Aromatics | 21.7 | 26.8 | 32.9 |
| $C_1$ + Ethane | 8.8 | 16.3 | 21.6 |
| Propane | 43.2 | 32.8 | 15.4 |

Comparison of the results of Example 2 and Comparative Example B indicate a higher yield of aromatics obtained with the process of this invention, particularly the valuable BTX fraction and benzene, than are obtained with the use of a corresponding conventional zeolite prepared with an organic directing agent or template.

EXAMPLES 3 to 5 and COMPARATIVE EXAMPLE C

The procedure of Example 1 and Comparative Example A was followed except that only a single run at 550° C. and a time on stream of about 40-60 minutes was carried out for each example. In addition, Example 3 utilized the same unmodified acid form of ZSM-5 zeolite prepared as shown in Example 1; Example 4 utilized a catalyst prepared as in Example 1 and then calcined in air at 700° C. for 3 hours, after which the zeolite had a silica/alumina ratio of 61:1; Example 5 utilized a catalyst prepared as in Example 1 and then subjecting it to a steam treatment by exposing it to a stream of low vapor steam and ammonia containing 2 to 25 wt. % of steam, at 538° C. for 4 hours. The zeolite was then purged with dry nitrogen and calcined at 538° C. for 4 hours after which the zeolite had a silica/alumina ratio of 75:1; and comparative Example C utilized the same conventional ZSM-5 catalyst as Comparative Example A. In each of these examples, the conversion of n-hexane was 100%. Results are shown in Table V.

TABLE V

| Example | 3 | 4 | 5 | C |
|---|---|---|---|---|
| Yield, wt. % | | | | |
| Benzene | 19.4 | 22.9 | 20.2 | 10 |
| Toluene | 17.1 | 19.4 | 20.5 | 15.6 |
| $C_8$ Aromatics | 5 | 5.6 | 6.9 | 7.6 |
| Total BTX | 41.5 | 47.9 | 47.6 | 33.2 |
| Total Aromatics | 51.5 | 55.3 | 51.4 | 38.8 |
| $C_1$ + Ethane | 37.6 | 34.5 | 33 | 26.5 |
| Propane | 4.8 | 4 | 7.4 | 20.0 |

The results of Table V indicate that in terms of aromatics yields and particularly the BTX fraction and benzene, the process of this invention utilizing a zeolite prepared from a composition comprising a precipitated amorphous silica and free of any organic or inorganic directing agent or template, is superior to a process utilizing a corresponding conventionally prepared zeolite (Example 3 vs. Comparative Example C). Moreover, subsequent thermal or steam treatment of the unmodified catalyst under this invention improves the results further (Examples 4 and 5) except for the total aromatics yield obtained with the steam treated catalyst (Example 5) which is substantially the same as obtained with the unmodified catalyst (Example 3). The results of these examples also show that superior results are obtained utilizing catalysts prepared in accordance with this invention as compared with conventionally prepared catalyst, whether the silica/alumina ratio of the catalyst under the invention is above or below that of the conventional catalyst.

EXAMPLE 6

The procedure of Example 1 was followed except that the feed was a "Udex" raffinate remaining after the extraction of aromatics from a reformed refinery stream and containing by weight, 3.9% of aromatics, with the remainder comprising 99% of paraffins and less than 1% of trace olefins and consisting of the following components with respect to the number of carbon atoms: $C_5$, 6.3%; $C_6$, 46.7%; $C_7$, 33.6%; and $C_8$, 9.6%. The catalyst was a steam treated acid ZSM-5 zeolite prepared as in Example 5 and having a silica/alumna ratio of 63:1. The time on stream at each temperature was generally 40-60 minutes. Temperatures and results, including percent conversions of $C_5+$ paraffins, which were slightly under 100%, are shown in Table VI.

TABLE VI

| Temperature, °C. | 500 | 550 | 600 |
|---|---|---|---|
| Percent Conversion $C_5+$ Paraffins | 98.9 | 99.2 | 99.6 |
| Yield, wt. % | | | |
| Benzene | 14.8 | 25.8 | 35.4 |
| Toluene | 21.2 | 24 | 20.4 |
| $C_8$ Aromatics | 9.2 | 7.4 | 3.8 |
| Total BTX | 45.2 | 57.2 | 59.6 |
| Total Aromatics | 51.5 | 62.3 | 66.8 |
| $C_1$ + Ethane | 20.2 | 25.7 | 26.8 |
| Propane | 21.1 | 4.9 | .3 |

COMPARATIVE EXAMPLE D

The procedure of Example 6 was followed except that the catalyst was a conventional ZSM-5 zeolite prepared as in comparative Example A. Conditions and results of this example are shown in Table VII.

TABLE VII

| Temperature, °C. | 500 | 550 | 600 |
|---|---|---|---|
| Percent Conversion, $C_5+$ Paraffins | 99 | 99.7 | 99.9 |
| Yield, wt. % | | | |
| Benzene | 7.6 | 12.7 | 21.8 |
| Toluene | 14.9 | 19.3 | 19.9 |
| $C_8$ Aromatics | 9 | 9.1 | 6 |
| Total BTX | 31.5 | 41.1 | 47.7 |
| Total Aromatics | 38.2 | 48.3 | 55.3 |
| $C_1$ + Ethane | 16.5 | 24.4 | 29.3 |
| Propane | 30.3 | 14.2 | 3.4 |

Comparison of the results of Example 6 and Comparative Example D (Tables VI and VII) shows that a process utilizing a steam treated zeolite catalyst prepared in accordance with this invention yields results superior to those obtained with a corresponding conventional zeolite in terms of aromatics production, particularly the BTX fraction and benzene, when the feed is a complex aliphatic mixture such as a refinery raffinate.

EXAMPLE 7

The procedure of Examples 3 to 5 was followed for the conversion of n-hexane using a constant temperature of 550° C., except that the WHSV was varied for three periods on stream each of which was about 40–60 minutes, and the catalyst was a gallium impregnated ZSM-5 prepared in accordance with this invention using a standard incipient wetness technique, wherein the ammonium form of the zeolite of Example 1, i.e., before calcination to obtain the acid form, was contacted with $Ga(NO_3)_3$ dissolved in enough water to wet the entire zeolite. The wet zeolite was dried at 100°–120° C. and calcined at 538° C. for at least 2 hours. The conversion of n-hexane was 100% in each case. Space velocities and results are shown in Table VIII.

TABLE VIII

| Space Velocity, WHSV | 1.0 | 4.9 | 10.3 |
|---|---|---|---|
| Yield, wt. % | | | |
| Benzene | 24.3 | 17.2 | 15.7 |
| Toluene | 19.4 | 26.4 | 24 |
| $C_8$ Aromatics | 4.3 | 11.1 | 12.2 |
| Total BTX | 48 | 54.7 | 51.9 |
| Total Aromatics | 66.3 | 63.5 | 57.2 |
| $C_1$ + Ethane | 28.5 | 19.7 | 14.1 |
| Propane | 0.3 | 8.1 | 12.1 |

COMPARATIVE EXAMPLE D

The procedure of Example 7 was followed except that the catalyst was prepared by impregnating with gallium, as shown in Example 7, the ammonium form of a conventional ZSM-5 catalyst prepared as shown in comparative Example A. Conditions, including space velocities and percent conversions of n-hexane, which were slightly lower than 100% at higher space velocities, and results, are shown in Table IX.

TABLE IX

| Space Velocity, WHSV | 1.0 | 5.0 | 9.9 |
|---|---|---|---|
| Percent Conversion | 100 | 99.9 | 96.5 |
| Yield, wt. % | | | |
| Benzene | 17.7 | 14.2 | 8.9 |
| Toluene | 22.1 | 24 | 18.2 |
| $C_8$ Aromatics | 8.3 | 13.8 | 13.5 |
| Total BTX | 48.1 | 52 | 40.6 |
| Total Aromatics | 56.5 | 58.6 | 46 |
| $C_1$ + Ethane | 23.1 | 13.4 | 8.3 |
| Propane | 9.7 | 14.4 | 14.5 |

Comparison of the results of Example 7 and Comparative Example D indicates that a process utilizing a gallium-impregnated zeolite produced in accordance with this invention yields higher proportions of total aromatics and benzene and higher BTX fractions at space velocities above 1, than a similar process carried out with a corresponding gallium-impregnated conventional ZSM-5 zeolite as catalyst.

We claim:

1. A process for producing aromatic compounds which comprises contacting under conversion conditions a feed comprising aliphatic hydrocarbons with a crystalline aluminosilicate zeolite catalyst in its acid form, having a Constraint Index in the range of about 1 to 12 and prepared by crystallizing a composition comprising an aqueous suspension of a precipitated amorphous silica or aluminosilicate precursor composed of a preponderant number of particles having a particle size in the range of about 1 to 500 microns, said composition being free of any organic directing agent and containing a dissolved alumina source if a precipitated amorphous silica is utilized or a precipitated amorphous aluminosilicate is utilized containing less than the desired amount of aluminum.

2. The process of claim 1 wherein a precipitated amorphous silica is utilized which is prepared by slowly neutralizing a sodium silicate solution with an acid precipitating agent while keeping the molar proportions of reactants constant.

3. The process of claim 2 wherein said acid precipitating agent is sulfuric acid.

4. The process of claim 2 wherein the alumina source present in said composition being crystallized is an aluminum sulfate or nitrate.

5. The process of claim 1 wherein said crystallizing is carried out by heating said composition to a temperature of about 80° to 250° C. for a period of at least 2 hours.

6. The process of claim 1 wherein said zeolite is a ZSM-5.

7. The process of claim 6 wherein said ZSM-5 as synthesized has a silica/alumina molar ratio of about 20 to 100.

8. The process of claim 1 wherein said zeolite is subjected to a thermal treatment at a temperature of at least about 675° C. for a period of at least 1 hour prior to being contacted with said feed.

9. The process of claim 1 wherein said zeolite is contacted with a gas comprising at least 0.1 wt. % of steam or ammonia, or both, at a temperature of at least about 350° C. for a period of at least about 0.5 hour, before being contacted with said feed.

10. The process of claim 1 wherein said zeolite is impregnated with gallium before being contacted with said feed.

11. The process of claim 1 wherein said feed is a raffinate remaining after aromatics extraction from a reformed refinery stream and containing more than 90% of aliphatics and more than 50% of $C_5$–$C_7$ paraffins, based on the weight of the feed.

12. The process of claim 1 wherein said feed consists of at least one paraffin and said conversion conditions include a temperature of from about 100° C. to about 700° C., a pressure of from about 0.1 to about 60 atmospheres, a WHSV of from about 0.5 to about 400, and a hydrogen/hydrocarbon mole ratio of from about 0 to about 20.

13. The process of claim 1 wherein said aliphatic hydrocarbons contain 2 to 12 carbon atoms and said conversion conditions include a temperature of from about 450° C. to about 700° C., a pressure of from about one to 60 atmospheres, and a WHSV of from about 0.5 to about 50.

* * * * *

UNITED STATES PATENT AND TRADEMARK OFFICE
CERTIFICATE OF CORRECTION

PATENT NO. : 4,822,941
DATED : April 18, 1989
INVENTOR(S) : D.J. Baillargeon et al.

It is certified that error appears in the above-identified patent and that said Letters Patent is hereby corrected as shown below:

Col. 1, line 7         "136,125" should be --136,215--
Col. 11, line 69       "3.07'" should be --3.7--

Signed and Sealed this

Eighth Day of May, 1990

Attest:

HARRY F. MANBECK, JR.

Attesting Officer        Commissioner of Patents and Trademarks